United States Patent

Yamane et al.

[15] 3,654,559

[45] Apr. 4, 1972

[54] WORD GENERATING APPARATUS

[72] Inventors: Kazuo Yamane, Tokyo; Hiromi Maruyama, Asaka, both of Japan

[73] Assignee: Takeda Riken Industry Company Limited, Tokyo, Japan

[22] Filed: Mar. 31, 1970

[21] Appl. No.: 24,209

[30] Foreign Application Priority Data

Apr. 1, 1969 Japan....................................44/24392
Feb. 24, 1970 Japan....................................45/15185

[52] U.S. Cl...............................328/61, 307/223, 307/260, 328/43, 331/78, 340/348, 340/265

[51] Int. Cl...............................H03k 3/64

[58] Field of Search..................328/59, 60, 61, 43; 307/223, 307/260; 331/78; 340/348, 349, 253, 254, 256, 265

[56] References Cited

UNITED STATES PATENTS

| | | | |
|---|---|---|---|
| 3,521,185 | 7/1970 | Ley | 328/59 X |
| 3,089,090 | 5/1963 | Price | 328/60 X |
| 3,268,821 | 8/1966 | Wang | 328/61 X |
| 3,257,637 | 6/1966 | Henry | 328/61 X |
| 3,464,018 | 8/1969 | Cliff | 328/61 |
| 3,482,117 | 12/1969 | Wallace, Jr. | 328/61 X |

*Primary Examiner*—Donald D. Forrer
*Assistant Examiner*—R. C. Woodbridge
*Attorney*—William J. Daniel

[57] ABSTRACT

This disclosure includes embodiments of apparatus for generating patterns of pulses comprising fixed or random series of pulses of predetermined bit lengths using a first register driven by pulses at the pattern clock rate, and the stages of the first register being coupled each to drive at least one other register having multiple output stages, and the latter being coupled to gating means to be gated with outputs from said first register. Random series of pulse patterns are generated in an embodiment including switching of the outputs of the other registers to the gating means, which switching is controlled by random signals generated in another register.

2 Claims, 6 Drawing Figures

WORD GENERATING APPARATUS

This invention relates to a binary word generating apparatus for producing patterns of pulses.

For example, in the testing of PCM communication apparatus or the inspection of an integrated circuit, patterns of pulses of very high speed and long bit lengths are required. In order to obtain such patterns of pulses, there has already been used an apparatus wherein as many registers are used as bits as required and these registers are ring-connected to control switches connected to the respective register outputs to be closed or opened depending on whether the respective bits of the generated pulse pattern are high or low and output signals there pass through the switches and are combined and sent out. However, such apparatus, as many high speed operating registers as there are bits in the pattern and all register the outputs must be combined by high resolution circuits. Therefore, in order to obtain patterns of pulses of high speed and long bit length the apparatus is very expensive and it is also difficult to make long bit lengths even using driving inputs having 25 to 50 bits at a rate of 200 MHZ.

Therefore, an object of the present invention is to cheaply provide a pattern pulse generating apparatus of high speed and having, for example, more than 1,000 bits.

Another object of the present invention is to cheaply provide a random pulse generating apparatus while at the same time reducing the number of registers requiring high speed operation.

Figures 1, 2:
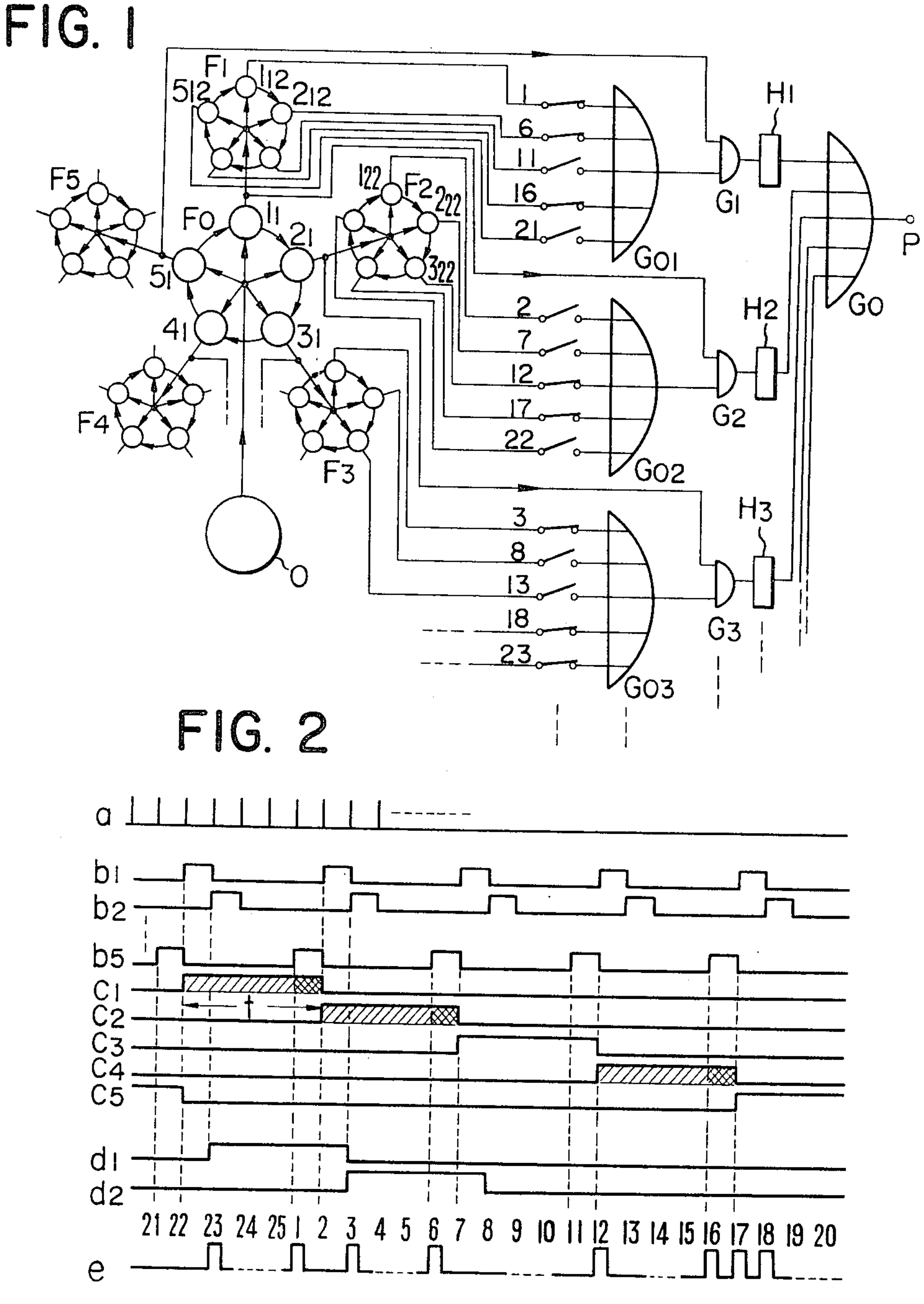
FIG. 1 is a view showing an embodiment of the apparatus of the present invention.
FIG. 2 is a wave form diagram for the respective parts in the apparatus shown in FIG. 1.

The present invention shall be explained with reference to the drawings. FIG. 1 is an embodiment of the present invention wherein five flipflop circuits or registers $1_1$, $2_1$, — are connected in a ring to form a ring counter or feedback register and are driven with the output of a pulse generator O having a frequency equal to the clock frequency of the pulse pattern to be obtained. The respective outputs of the ring counter register $F_0$ comprising the initial stage, drive other ring counter registers $F_1$, $F_2$. Switches 1, 6, 11, —; 2, 7, 12, — are connected respectively to the outputs of the registers $1_{12}$, $2_{12}$ —; $1_{22}$, $2_{22}$, and the outputs obtained through the respective switches are applied respectively to OR-gate circuits $G_{01}$, $G_{02}$, —. In turn, their outputs and the outputs of the registers $5_1$, $1_1$, $2_1$, — are applied to AND-gate circuits $G_1$, $G_2$, —. The outputs of these respective AND-gate circuits $G_1$, $G_2$, — are applied to an OR-gate $G_0$ through wave shaping circuits $H_1$, $H_2$ —, and the combined output is sent out of a terminal P.

Thus, in the apparatus in FIG. 1, the respective outputs of the ring counter flipflops $1_1$, $2_1$, — drive a plurality of other ring counter registers $F_1$, $F_2$, —. In turn, the outputs of the respective registers $1_{12}$, $2_{12}$, —; $1_{22}$, $2_{22}$, — are selectively applied to the output terminal P through the switches 1, 6 —, 2, 7, —, for example, the output of the register $F_1$ driven by the registor flipflop $1_1$ is gated with the output of the flipflop $5_1$ which is one before the above mentioned flipflop $1_1$ as the ring counter $F_0$ in the initial stage is driven by clock pulses. Therefore, if the output pulses of the pulse generator O are represented by *a* in FIG. 2, the flipflops $1_1$, $2_1$, — $5_1$ send out the outputs of $b_1$, $b_2$, — $b_5$ in the diagram, respectively.

Further, the respective flipflops in the register $F_1$ send out the outputs of $C_1$, $C_2$, — $C_5$ in FIG. 2 and those in the register $F_2$ send out the outputs of $d_1$, $d_2$, —. These outputs are applied to the switches 1, 6, —; 2, 7 —. However, since the switches 1, 6 and 16 are closed, but the switches 11, 21, 2 and 7 are opened, only the hatched pulses in FIG. 2 are applied to the AND-gate circuits $G_1$ and $G_2$ and the other pulses are cut off. Further, since certain outputs of the register $F_0$ are added to the AND-gate circuits $G_1$, $G_2$, —, in the diagram, only the double hatched pulse portions pass through the above mentioned gate circuits and are sent out of the output terminal P as pulses of half the width through shaping circuits $H_1$, $H_2$, —. An *e* in FIG. 2 shows an output pulse train thus obtained. That is to say, pulses of a fixed width *t* are applied in the order of the numerals 1, 2, 3, — to the above described switches, the pulses having been passed through the AND-gate by certain outputs of the register $F_0$ and the output is shaped and is sent out of the output terminal. Therefore, if the respective switches 1, 2, 3, — are kept closed or opened depending on whether the respective bits of the pulse pattern to be obtained are high or low, a resulting pattern of pulses as in *e* in FIG. 2 is obtained. The numerals of the corresponding switches are shown above them. In the apparatus in the above mentioned FIG. 1, for example, to the gate circuit $G_1$ are applied the outputs of the register $F_1$ and the output of the flipflop $5_1$ which is one stage before the flipflop $1_1$ driving the register $F_1$. Therefore, as shown in $C_1$ and $b_5$ in FIG. 2, the output pulse of the flipflop $5_1$ is applied to the trailing edge of the output pulses of the OR-gate circuit $G_{01}$. Therefore, even in case a considerable lag is caused to the generating of signals by the register $F_1$ and OR-gate circuit $G_{01}$, there is no danger of a resulting lag between the two pulses applied to the AND-gate circuit $G_1$ or the others, and the operation is positive.

Figure 3:
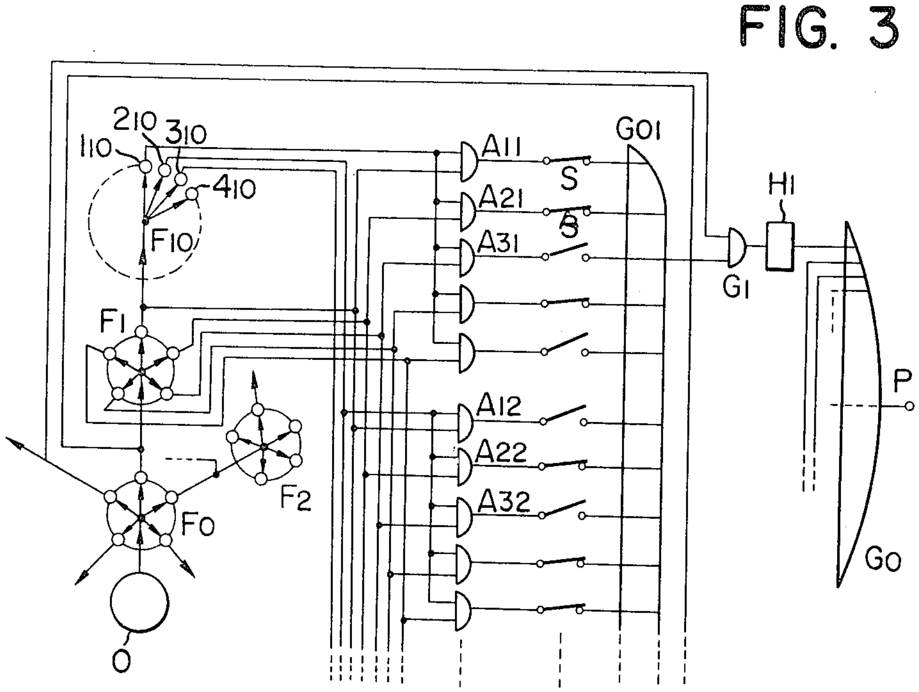
FIGS. 3 and 4 are respectively views showing other embodiments of the present invention.

FIG. 3 shows an apparatus wherein any desired pattern of pulses can be obtained by using fewer registers than there are bits in the pattern. The same parts as in FIG. 1 are designated by the same corresponding numerals. That is to say, the register $F_{10}$ in which, for example, 40 stages are ring connected is driven by the output of any one stage in the registers $F_1$, $F_2$, —. The outputs of the registers $F_1$ and $F_{10}$ are respectively combined and are applied to 200 AND-gate circuits $A_{11}$, $A_{21}$ —; $A_{12}$, $A_{22}$ — and similar switches S as in the apparatus in FIG. 1. Therefore, through five switches are connected to the register group $F_1$ in the apparatus in FIG. 1, they are increased to 200 switches in FIG. 3 which are 40 times as many and thus a pulse pattern of 1,000 bit positions in all can be obtained. And yet, the number of the flipflops is $40 \times 5 + 5 \times 5 + 5 = 230$ and is reduced to be about one-fifth the number required in the case by a conventional system.

Figure 4:
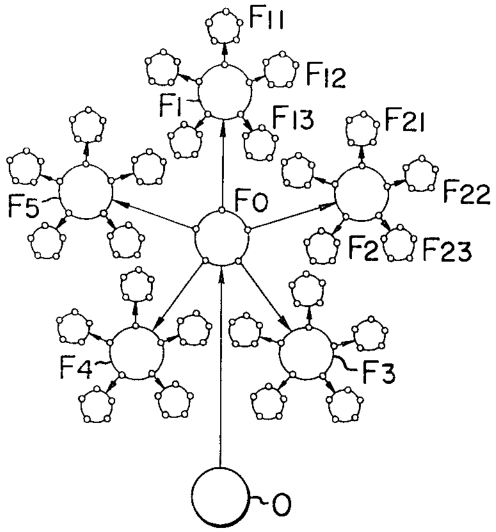

Further, in the apparatus in FIGS. 1 and 3, the registers $F_1$, $F_2$, — $F_5$ are driven by the respective outputs of the register $F_0$ which is in turn driven with the output of the clock pulse generator O and the outputs of the respective stages of the registers are applied to the selecting switch. Therefore, in the apparatus in FIG. 1, as in *e* in FIG. 2, a pulse pattern of 25 bit positions is obtained. But, in the apparatus in FIG. 4, the registers $F_{11}$, $F_{12}$, —; $F_{21}$, $F_{22}$, —; — are driven respectively with the respective outputs of the registers $F_1$, $F_2$, — $F_5$. Thus, when a plurality of stages of registers are driven sequentially and a selecting switch is connected to the register at the end, even a pattern pulse of more than 1,000 bit position at a high speed can be easily obtained. Also, in this apparatus, the width of the pulses applied from the register $F_{11}$, $F_{12}$, etc. to the AND-gate circuits corresponding to the gate circuit $G_1$, etc. in FIG. 1 or 3 is very large and pulses are delivered from the register $F_0$ on its trailing edge. That is to say, the lag of signals by the registers $F_1$, $F_{11}$, etc. can be expected to be large enough. Therefore, though more registers than in the apparatus in FIG. 3 are required, pattern pulses of a very high speed can be obtained.

As described above, in the present invention, the respective outputs from the ring-connected first register drive, a plurality of other ring connected registers and, as required, outputs from the stages of these registers are switched by selecting switch means controlled by the last register. Therefore, the first register operates at the clock frequency but the operating speeds of the registers in the second and third stages reduce in turn to 1/m, (1m·n), — wherein *m* and *n* represent the number of stages in these registers. Therefore, the number of the registers requiring high speed operation is very small and most of the registers can be made low in resolution and cheap. Further, as no high performance is required, the apparatus can be made small by utilizing integrated circuits. As the flipflops driven directly with the output of the clock pulse generator are only those belonging to the first register patterns of pulses of many more bits than 1,000 can be easily obtained with a low power pulse generator. Thus, in the present invention, high speed and long bit lengths can be easily generated requiring only a few high speed registers, and the apparatus can be manufactured very cheaply. MOst of the apparatus requires no high performance parts and therefore can be made small by utilizing integrated circuits. By the way, the above explanation has been made on the assumption that fixed pulse patterns are obtained by keeping the on-and off-states of the switch groups always constant. However, if the above mentioned switches are formed of electronic circuits and are respectively controlled in response to binary parallel signals the pulse pattern can be varied at a high speed. That is to say, such apparatus can be used also in the case of converting binary parallel signals to series signals.

The apparatus according to the present invention can be utilized also for an apparatus for generating psendo random pulses of a maximum period to period sequence, that is, an M sequence.

In such apparatus, an adder having modulus 2 is inserted as a stage in one of the shift registers and, for example, the input and output of the preceeding register are applied to take random pulses out of that register. However, as all of the many annularly connected registers are driven with clock pulses, in order to obtain high speed pulses, very many high speed operating registers are required so that the apparatus is very expensive.

According to the present invention, an apparatus providing high speed operation can be obtained cheaply.

Figure 5:
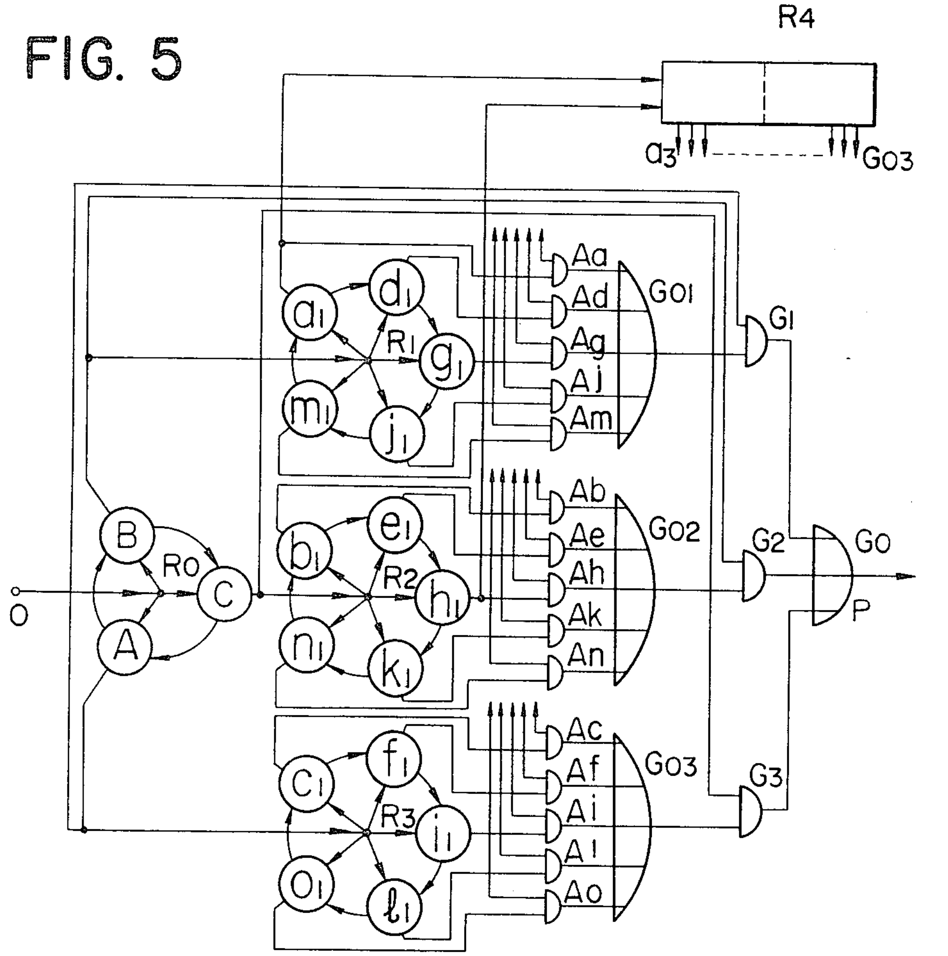
FIG. 5 is a view showing an embodiment of the random pulse generating apparatus using the apparatus according to the present invention.
Figure 6:
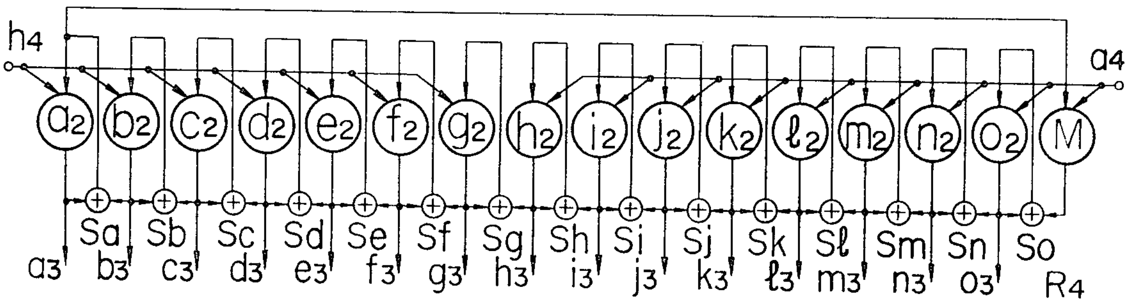
FIG. 6 is a view showing details of a part of the apparatus shown in FIG. 5.

FIGS. 5 and 6 show an embodiment of the present apparatus. The register $R_0$ in the initial stage and the other ring connected registers $R_1$, $R_2$ and $R_3$ are respectively the same as the registers $F_0$, —— $F_5$ shown in FIGS. 1, 3 and 4, the stages $a_1$, $d_1$, $g_1$ ——; $b_1$, $e_1$, ——; $c_1$, $f_1$ —— of the respective stages groups are respectively the same as the registers $1_{12}$, $2_{12}$ ——; $1_{22}$, $2_{22}$ —— shown in FIGS. 1, 3 and 4 and their operations are also the same as in the apparatus shown in the above mentioned FIGS. 1 to 4.

The outputs of the stages $a_1$, $d_1$, $g_1$ ——; $b_1$, $e_1$ ——; $c_1$, $f_1$, —— of the respective registers $R_1$, $R_2$ and $R_3$ and the output of a controlling register $R_4$ are applied to AND-gates $Aa$, $Ad$, $Ag$, ——; $Ab$, $Ae$ ——; $Ac$, $Af$ ——. Further, the outputs of the above mentioned three sets of AND-gates are combined respectively at the OR-gates $G_{01}$, $G_{02}$ and $G_{03}$ and are further applied to the AND-gates $G_1$, $G_2$ and $G_3$ together with the outputs of the respective OR-gates and the outputs of the three flipflops stages A, B and C, and these outputs are combined at the OR-gate $G_0$ so that an M sequences random pulse train may be sent out of the output terminal P.

FIG. 6 is a detail view of the controlling register $R_4$. Stages $a_2$, $b_2$, $c_2$, —— $0_2$ and adders $Sa$, $Sb$, $Sc$, —— $So$ having modulus 2 are provided. A signal corresponding to the sum of its own output signal, and for example, the output signal of the flipflop in the preceding stage in FIG. 6 is applied to each flipflop and the output signal of the adder $Sa$ is added through a memory stage M to the adder $So$ provided at the input end of the stage $O_2$. Further, the output of the flipflop $h_1$ in FIG. 5 is applied from the terminal $h_4$ to the stages $a_2$, $b_2$, —— $g_2$ to drive them. The output of the flipflop $a_1$ in FIG. 5 is applied from the terminal $a_4$ to drive the flipflops $h_2$, $i_2$, —— $0_2$ and M. Such output signals of the stage registers $a_2$, $b_2$, —— $0_2$ are respectively applied from the terminals $a_3$, $b_3$, —— $0_3$ to the AND-gates $A_a$, $A_b$, $A_c$, —— $A_0$ in FIG. 5.

In the described apparatus, the ring connected first register R0 is driven by clock pulses at the terminal O and therefore operates at a high speed, but the succeeding ring connected registers $R_1$, $R_2$ and $R_3$ are only advanced by one step whenever the register Ro completes one count or cycle and therefore their operating speed is reduced by one-third. Further, as the registers $R_1$, $R_2$ and $R_3$ are driven in turn in this manner, the respective registers operate in the sequence $a_1$, $b_1$, $c_1$, —— $0_1$, $a_1$ —— and send out output signals of a width three times as large as the clock pulse interval. Further, the controlling register in FIG. 6 is driven by the output of the ring connected register in the succeeding stage. Therefore, whenever the output delivered by the stages $a_1$, $b_1$, —— $0_1$ completes one round, or cycle one signal is sent out of each of the terminals $a_3$, $b_3$, —— $0_3$. The AND-gates $A_a$, $A_b$, —— gate the outputs of the stages $a_1$, $b_1$, —— to deliver "1" or "0" signals. Further, as the controlling stages $a_2$, $b_2$, —— $g_2$ are driven by the output of the stage $h_1$ and the controlling stages $h_2$, $i_2$, —— $0_2$ are driven by the output of the flipflop $a_1$, the outputs of the flipflops $a_1$, $b_1$, —— $0_1$ are applied to the above mentioned respective AND-gates in the later portions of the pulse widths of the signals sent out of the terminals $a_3$, $b_3$, —— $g_3$ and $h_3$, $i_3$, —— $0_3$. Therefore, even in the case that a time lag is caused until the output signal of the controlling register $R_4$ propagates to the above mentioned AND-gate, a positive gate control is made. Further, the momory stage M is to adjust the time when the output signal of the adder Sa is applied to the adder So.

If random parallel pulse trains are sent out of the output terminals $a_3$, $b_3$, —— of the controlling register $R_4$ at a time when driving pulses are applied to the terminals $h_4$ and a $a_4$ and the next period is reached, for example, the terminal $e_3$ will send out the sum of the signal of this terminal itself and the signal of the terminal $f_3$ in the preceding stage. That is to say, in case the signals of the terminals $e_3$ and $f_3$ are respectively 1 and 1 or 0 and 0, a binary zero will be sent out and, in case they are respectively 1 and 0 or 0 and 1, a binary one will be sent out. Thus, each output terminal sends out a binary 0 or 1 with exactly the same probability regardless of its signal in the preceding cycle and therefore the terminals $a_3$, $b_3$, —— $0_3$ send out perfectly random parallel signals in each cycle. As the outputs of the flipflop $a_1$, $b_1$, —— are gated by these signals, the AND-gates Aa, Ab, —— also send out random pulses. Though these pulses have a time width three times as large as the time interval of the clock pulses as described above, as the gates Aa, Ab, —— send out outputs in this sequence, the output pulses of the gates Aa, Ad, Ag, ——; Ab, Ae, ——; Ac Af, —— do not overlap with one another. These pulses are combined respectively at the OR-gates $G_{01}$, $G_{02}$ and $G_{03}$ and are applied to the AND-gates $G_1$, $G_2$ and $G_3$ as inputs on one side. Also, to these AND-gates $G_1$, $G_2$ and $G_3$ are applied the outputs of the flipflops A, B and C in the initial stage as other inputs. Further, the outputs of the flipflops A, B and C are applied at the trailing edges of the respective outputs sent out of the OR-gates $G_{01}$, $G_{02}$ and $G_{03}$. Therefore, the time width of the output pulses of the above mentioned OR-gates will be reduced respectively to one-third and the pulses are combined at the OR-gate G0 so as not to overlap with one another. Therefore, a random series pulse train is sent out of the output terminal P.

As explained above, in the apparatus of this embodiment, pseudo random pulses of a series M sequences are to be sent out and only a few flipflops in the initial stage operate at the clock frequency of said pulse train and the succeeding and the controlling register operate at a speed only less than a fraction of their speed. That is to say, high speed M sequences pulses can be generated by using few expensive high speed components and therefore the apparatus can be manufactured vary cheaply. By the way, in the above described embodiment, the ring connected registers are coupled to form only two stages. But multistage ring connected registers coupled can be in greater numbers to further drive other registers in turn by using the outputs of the respective final stages so that the operating speeds of the respective registers may be reduced in turn and the apparatus may be manufactured more easily and cheaply.

What is claimed is:

1. A pulse pattern generating apparatus comprising pulse means for driving plural ring-connected registers including a first register having a plurality of successive stages respectively connected to drive separate other ones of said registers in turn, the outputs from the stages of the other driven registers being gated respectively with the outputs of the preceeding driving register stages, said first register being driven with the clock frequency of the pulse pattern.

2. A generator according to claim 1 for generating a random pattern wherein the outputs from the stages of said other registers are connected by electronic switching means to said gating to receive their output signals, a controlling register having plural stages driven by outputs of said driven registers, and the latter stages delivering signals connected to control said electronic switching means, whereby the outputs of said driven registers are both gated respectively with the outputs of said driving register stages and in addition are randomly switched on and off by said control signals.

* * * * *